United States Patent [19]
Dechow et al.

[11] Patent Number: 5,516,330
[45] Date of Patent: May 14, 1996

[54] AIR CONDITIONING SYSTEM FOR A PASSENGER AIRCRAFT

[75] Inventors: Martin Dechow; Thomas Scherer, both of Hamburg, Germany

[73] Assignee: Daimler-Benz Aerospace Airbus GmbH, Hamburg, Germany

[21] Appl. No.: 324,221

[22] Filed: Oct. 17, 1994

[30] Foreign Application Priority Data

Oct. 15, 1993 [DE] Germany .......................... 43 35 152.2

[51] Int. Cl.$^6$ ................................................. B64D 13/02
[52] U.S. Cl. ............................. 454/74; 454/261; 165/16
[58] Field of Search ..................... 454/261, 269, 454/71, 76; 165/16

[56] References Cited

U.S. PATENT DOCUMENTS

| | | | |
|---|---|---|---|
| 2,315,517 | 4/1943 | Greenlee et al. | 165/16 |
| 3,269,801 | 8/1966 | Boberg et al. | 454/76 X |
| 4,457,357 | 7/1984 | Van Arnhem | 165/16 X |
| 4,506,514 | 3/1985 | Lamar et al. | 165/16 X |
| 4,567,939 | 2/1986 | Dumbeck et al. | 165/16 |

FOREIGN PATENT DOCUMENTS

| 0301607 | 12/1991 | European Pat. Off. . |
|---|---|---|
| 865358 | 5/1992 | Germany . |

Primary Examiner—William E. Tapolcal
Attorney, Agent, or Firm—W. G. Fasse; W. F. Fasse

[57] ABSTRACT

An air conditioning system for a pressurized aircraft body includes an air flow closed loop into which fresh air may be introduced either through a fresh air treatment unit or through a trim valve or through both. A first series connection of system components includes a fresh air intake (FA), a closed loop controlled volume flow control valve (FCV) (11, 11.1, 11.2), an air-conditioner (8, 8.1, 8.2), an air mixer (9), and the space (10) to be air-conditioned interconnected by air ducts. A cabin pressure closed loop control (1) controls the air volume through the (FCV) valve. The air-conditioner unit (8) is controlled by an air conditioning closed loop control (2). A second series connection includes a filter (7), a blower (6), and a heat exchanger (4) and preferably a $CO_2$ adsorber (5) series connected between the blower (6) and the heat exchanger (4). This second series connection forms a recycling circuit flow connected in parallel to the air mixer (9) and to the space (10). The air mixer (9) receives recirculated air from the second series connection and fresh air from the air-conditioner (8). The blower (6) and the heat exchanger (4) are controlled by a cabin zone closed loop control (3) which receives sensor information for the closed loop control. A trim air duct (12A) with a respective trim air valve (12) also controlled in closed loop fashion, is connected to by-pass the first series connection except the space (10) so that trim air can be added to the recycling air just upstream of the space (10). Up to 85% vol. % of cabin air is recycled which minimizes the use of fresh air, for a reduction of the fuel consumption.

18 Claims, 3 Drawing Sheets

AIR CONDITIONING SYSTEM FOR A PASSENGER AIRCRAFT

FIELD OF THE INVENTION

The invention relates to an air conditioning system for passenger aircraft. In such systems the fresh air volume flow into the aircraft is controlled to maintain the pressurization and temperature at least in the passenger cabin and in the cockpit, while also using a small volume of recycled cabin air.

BACKGROUND INFORMATION

It is known to supply a constant fresh air volume flow into the pressurized body of passenger aircraft on the ground and in the air for ventilating the passenger cabin, the cockpit, the electronics room and the cargo space. The air quality is maintained particularly in the cabin and in the cockpit by a constant volume air flow. In order to maintain the temperature and the air flow velocity of the ventilation air at a comfort level for the passengers and crew in the aircraft, a constant air volume in the form of a so-called recirculation air volume is admixed to the fresh air. The recirculation air is a small proportion of used cabin air. For this purpose the fresh air treatment facilities or so-called "climate packs" and the flow control valves (FCV) are controlled in closed loop fashion in accordance with the constant volume flow also referred to as bleed air. Only fault situations can cause a variation in the normally constant volume flows. Exceptions involve an additional air requirement for ventilating a cargo hold and for a so-called "economy mode" of operation for the cabin. Under these exceptions the air flow is adjusted to another value which, however, also becomes a constant value after adjustment. Thus, the conventional teachings make possible substantially only the switching between an economy mode, a normal mode, and a maximum mode, each having a constant air flow.

The conventional air conditioning in an aircraft is controlled in closed loop fashion so that the temperature in the cabin and in the cockpit is controlled in response to the outlet temperature of the climate pack or packs and by the so-called trim system. The outlet temperature of the climate pack or packs is used for adjusting the lowest temperature of all required air temperatures. The temperatures for zones requiring a higher temperature are controlled in closed loop fashion by admixing hot trim air from the engines.

Conventionally, it is a disadvantage that a high proportion of the used cabin air is not treated for reuse because the ventilation of the pressurized aircraft body is dependent on an open loop and closed loop control of the air volume flow in accordance with constant air flows, namely a constant volume fresh air flow and a constant volume recirculation air flow to be treated. Fresh air is conventionally not supplied with a view to merely compensating for leakage. Rather, the fresh air supply is intended to provide a sufficient ventilating of the pressurized aircraft body with a high proportion of fresh air, whereby the entire energy consumption or rather the fuel consumption of the system is correspondingly strained.

The closed loop pressure control in the pressurized aircraft body is conventionally performed disadvantageously independently of the fresh air volume and temperature control, whereby, the air flow which leaves the pressurized aircraft body, serves as a closed loop control value. If the pressure in the pressurized body rises, the air flow volume is increased. If the pressure falls, the air flow volume is correspondingly reduced in conventional systems.

The quality of the cabin air in a passenger and crew area, namely the cabin and the cockpit, is conventionally assured only by the constant fresh air flow of external air, whereby the required fresh air volume supply corresponds functionally to the required cabin air quality in the mentioned areas. The small proportion of used cabin air is passed through a particle filter and then added as recirculation air to the separately supplied fresh air for the ventilation. In conventional systems the recirculation air or used cabin air which is merely cleaned by a particle filter, but not treated in such a way that the recirculation air has fresh air quality, is a source of problems. Especially, if conventionally there is a significant increase in the used air proportion of the recirculating venting air, a very unfavorable effect on the well being of all passengers and crew members is observed because the recirculating air is insufficiently and poorly filtered, nor is it freed of disease carriers, for example bacteria and viruses which are present in the used air and which remain in the recirculated air. Additionally, the used air carries odor causing elements emanating from humans and food-stuffs. These components in the used air are substantially influenced by the people on board. In fact, the people on board substantially generate these components. Thus, it is conventionally undesirable to recirculate large proportions of used air. Conventional filter devices installed on board of aircraft do not satisfy current requirements where a significant increase of the used air proportion in the ventilating air is involved. Thus, conventional filtering devices cannot eliminate these conditions that are uncomfortable for passengers and crew.

Furthermore, the carbon dioxide proportion in the cabin air significantly and adversely influences the air quality. Without an adsorption of $CO_2$ the carbon dioxide proportion rises to unpermissably high values if a significant proportion of the recirculating ventilating air is used air. European Patent Publication EP 0,301,607 discloses a device and a method for an open loop and closed loop control of the ventilation of an enclosed pressurized space in such a manner that the pressure as well as the carbon dioxide concentration is maintained at a determined level within the enclosed space. For this purpose a pressure sensor measures the pressure level to provide an actual pressure value signal and a carbon dioxide sensor measures the carbon dioxide concentration in the enclosed space to provide an actual $CO_2$ value signal. A respective open/closed loop control device monitors the actually measured values and compares the actually measured values with a respective rated value to provide corresponding control signals.

The result of this comparing provides control signals for controlling the supply of pressurized fresh air and thus the pressure level in the enclosed aircraft body. The fresh air is drawn from the outside of the enclosed body. The outside fresh air is mixed with a portion of the used air from the enclosed space and the mixed air is again introduced. Thus, the pressure and the carbon dioxide concentration is automatically maintained at a predetermined level depending on the proportions of used and fresh air in the recirculated air mixture. In the just described conventional solution the ventilation of the cabin is performed only with a closed and open loop control based on the carbon dioxide concentration and on the pressure in the enclosed space, whereby both parameters are automatically modified in dependence on one another and in accordance with a predetermined level. The conventional method does not permit feeding a desirably tempered and clean conditioned air into the cabin because this known method does not use any further treatment of a portion of the used air with a view to removing therefrom the above mentioned disease carriers, odors and other contaminations. The known method also forgoes feeding into the cabin, air that has a comfortable temperature.

German Patent Publication DE 865,358 discloses a further solution for an open and closed loop control of the ventilation of an enclosed space. An air circulator feeds with an air shower a mixture of withdrawn and fresh air into the enclosed space. The supply of fresh air which is sucked off from outside the enclosed space, is controlled in open and closed loop fashion through a valve in dependence on the monitored carbon dioxide concentration. The control is performed by a carbon dioxide control device connected to a carbon dioxide sensor to which the control responds. The $CO_2$ sensor monitors the carbon dioxide concentration in the enclosed space. The known solution does not take into account any aspects of a pressure and temperature open loop and closed loop control. It does not involve any removal of excess heat which may possibly be present in the enclosed space nor does it remove disease carriers, odors, and other contamina tions from the cabin air that is being recycled.

OBJECTS OF THE INVENTION

In view of the above it is the aim of the invention to achieve the following objects singly or in combination.

An air conditioning system for an aircraft shall assure that the supply of external fresh air into the pressurized aircraft body is substantially reduced and that a high proportion of the used air in the passenger and possibly also the crew spaces in the aircraft body is treated for recycling back into these spaces such as the passenger cabin and cockpit.

The fresh air supply shall be performed so that the pressure in the pressurized aircraft body is subject to a closed loop control that maintains the pressurization, particularly the repressurization during descent flight, which compensates for leakage and removes a substantial proportion of the heat load out of the pressurized aircraft body.

The recycling of the cabin air shall assure the maintenance of an optimal air quality, whereby a further spreading of disease carriers, odor causing substances (olfactants), and other contaminations in the recycled air shall be prevented while a comfortable air temperature and preferably including the adsorption of excess carbon dioxide proportions from the recycled air shall be assured.

The treated recycled air introduced into the fresh air volume flow shall contribute to increasing the otherwise low relative humidity in the cabin air. The fresh air volume control and recycling system shall, as a unitary system, contribute to a substantial saving of fuel to thereby respectively reduce the total fuel consumption of the aircraft while simultaneously assuring a comfortable air quality and air values, such as temperature, humidity, and cleanness.

SUMMARY OF THE INVENTION

The above objects have been achieved according to the invention by an air conditioning system for an aircraft comprising an aircraft body including a space to be air conditioned by the combination of the following features. A portion of a first series connection of components for treating fresh air is connected in parallel with a second series connection of components for the recirculating used air so that a large proportion of recirculated and cleaned air is mixed with a small proportion of treated fresh air and the resulting mixed air is introduced into the space to be air-conditioned, under the closed loop control of a central processing unit, whereby a substantial savings of fuel is achieved without reducing the air quality in the aircraft.

More specifically, the components of the first series connection comprise a fresh air intake (FA), a fresh air volume control, at least one fresh air treatment unit, an air mixer, the space to be air-conditioned and first air ducts forming said first series connection. The components of the second series connection comprise a filter, a blower or fan, a heat exchanger, and second air ducts forming said second series connection. Preferably the second series connection also comprises a $CO_2$ adsorber connected in series between the blower and the heat exchanger. Third air ducts connect the second series connection in parallel to said space and to said air mixer, so that recirculation air withdrawn from said space by said blower and treated in said second series connection is returned to the air mixer which also receives fresh air from the fresh air intake through the volume control and through the fresh air treatment unit. The system further comprises first, second, and third closed loop control units connected in series with each other for a mutual information exchange. First conductors connect the first control unit to the volume control for a mutual information exchange and closed loop volume control. Second conductors connect the fresh air treatment unit to said second control unit for a mutual information exchange and a closed loop control of the air treatment. Third sensor conductors connect the air mixer, the heat exchanger, and the space to be air-conditioned to the third control unit for feeding sensor information to the third control unit. Fourth control conductors connect a control output of the third control unit to the blower in response to information received from and processed by the third control unit, whereby the recycling of used air from the space through the second series connection is increased and the introduction of fresh air is decreased for a reduction in the fuel consumption of the entire aircraft. Surprisingly, as little as 15 vol. % of fresh air and 85 vol. % of recycled air result in an acceptable air quality.

Advantages of the invention are seen in that the high volume percentage of up to about 85% of recirculated air reduces the total fuel consumption of the aircraft because less heat is necessary to bring cold air outside the aircraft at high altitudes to a comfortable cabin temperature if a substantially smaller volume of outside air needs to be heated than was necessary prior to the invention.

Another advantage is seen in that the cold outside air at high altitudes is efficiently used for cooling down the recirculating cabin air. However, the present system also works even on the ground if the heat exchanger of the recirculation second series connection has a sufficient cooling capacity.

It has been found that a relatively small volume percentage such as 15% of fresh outside air preferably tapped off from an engine housing is sufficient to replenish the oxygen content of the recirculating air to comfortable levels.

The section to be air conditioned within an aircraft body includes the passenger cabin and the cockpit which are preferably air-conditioned as separate sections. Incidentally, the closed loop control units are preferably part of a central processing unit.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
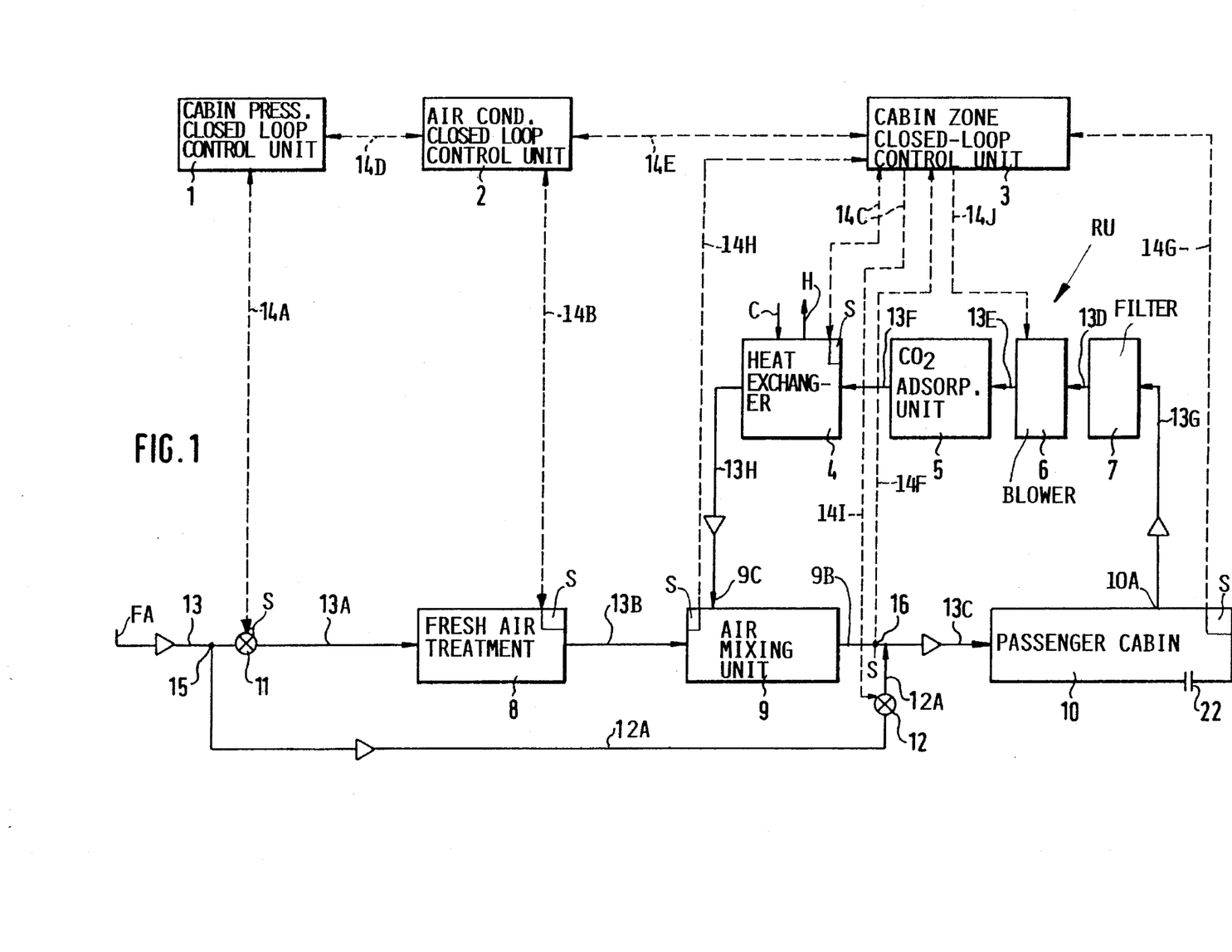
FIG. 1 shows a block circuit diagram of an air conditioning system according to the invention including a $CO_2$ adsorber and devices for air conditioning body sections of a passenger aircraft, wherein full line connections illustrate air flow ducts and wherein dashed line connections illustrate conductors such as electrical, or optical, or even pneumatic conductors.
Figure 3:
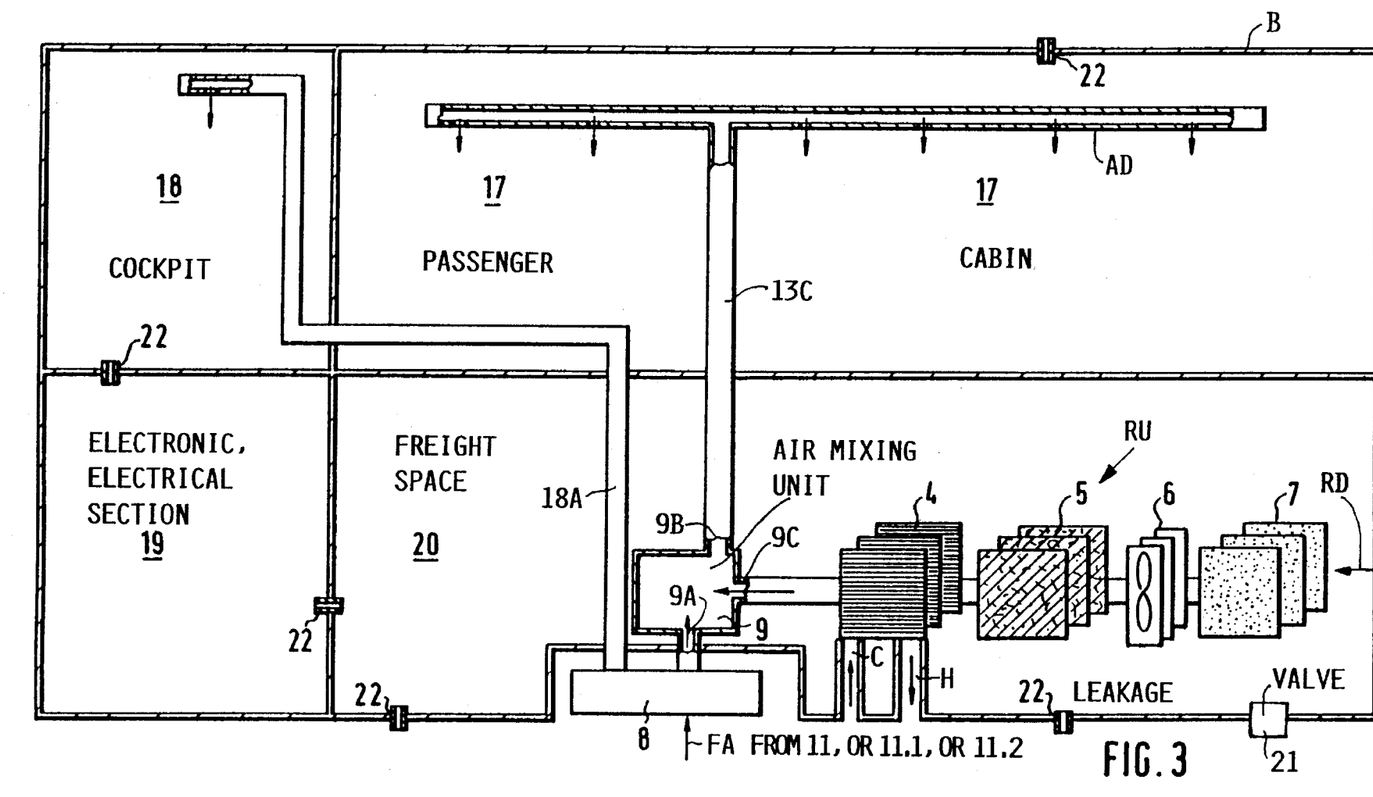
FIG. 3 shows schematically various sections within an aircraft body and their supply of conditioned air by the present system, whereby for example the cockpit receives only treated fresh air while the cabin receives treated recirculated air mixed with a small controlled volume of treated fresh air.

Referring to FIGS. 1 and 3, the present system for air conditioning sections 17, 18, 19, and 20 within an aircraft body B of a passenger aircraft, controls the fresh air volume flow, the pressure, the temperature and the relative humidity in a closed loop fashion. The system recycles a large volume proportion of used cabin air with the aid of the above mentioned first and second series connections.

Referring to FIG. 1, the first series connection of the system includes a fresh air intake FA, a flow volume control valve 11, a fresh air treatment unit 8 such as an air-conditioner, an air mixer unit 9, and the space 10. The output of the air mixer is connected to the space 10 to be air-conditioned. Incidentally, the arrow heads indicate the flow directions. The fresh air treatment unit 8 has an inlet connected through an air duct 13A with the air volume control valve 11 having an input connected through an air duct 13 to the fresh air intake FA which is preferably tapped off from at least one of the engines which heat the fresh air. The components FA, 13, 11, 13A, 8, 13B, 9, 13C, and 10 are connected in series with each other.

A trim air closed loop control valve 12 is operatively connected in a trim air duct 12A connected at 15 to the air duct 13 leading to the fresh air intake FA. The other end of the duct 12A is connected to the duct 13C between the mixer 9 and the space 10 to be air-conditioned. The air volume flow control valve 11 supplies a controlled partial volume of fresh air from the intake FA through the unit 8 to one input 9A of the air mixer 9. The output 9B of the air mixer 9 is connected to the space 10 through the air duct 13C. One or more sensors S at 16 sense control values such as the temperature, or volume, or relative humidity of the mixed air that includes a large proportion of recirculated air and a small proportion of the fresh air. The control values from the sensor or sensors S at 16 are used to open or close the valve 12 as will be described below. The just mentioned space 10 has a certain air leakage 22, whereby a portion of the used air is removed to the environment outside the aircraft body B. The components 11, 8, 9 and the space 10 to be air-conditioned comprise sensors S connected, preferably by electrical or optical conductors to control units 1, 2, and 3 for an information and control exchange to be described below.

The just described components 11, 8, 9, 10 with the air ducts 13, 13A, 13B, 13C form said first series connection that cooperates with a second series connection including a particle and/or odor filter unit 7, a blower unit 6, preferably but not necessarily a carbon dioxide adsorption unit 5, and a heat exchanger 4 connected in series with one another in the sequence just mentioned by air ducts 13D, 13E, and 13F, so that a recycling air flow passes through these units in the order or sequence stated. An outlet 10A of the space 10 to be air-conditioned is connected by a further air duct 13G to an inlet of the particle and/or odor filter unit 7, whereby a substantial proportion e.g. 85 vol. % of the air used up in the space 10 and not leaked out at 22 is supplied to the particle and/or odor filter unit 7 as recirculation air.

Cold air taken from outside of the aircraft body B is fed into an inlet C of the heat exchanger 4. An air outlet of the heat exchanger 4 is connected through an air duct 13H with a further input 9C of the air mixer 9, whereby the latter receives treated or processed recirculation air from the heat exchanger 4 and mixes the recirculation air with treated fresh air.

The above mentioned control units 1, 2, and 3 are preferably all part of a central processing unit including a cabin pressure closed loop control unit 1, an air conditioning closed loop control unit 2, and a cabin zone closed loop control unit 3 operatively, e.g. electrically or optically connected with one another in series for controlling the air flow based on a mutual information exchange between these units 1, 2, 3 and certain sensors S. The air volume flow control valve 11 is functionally and e.g. electrically connected with the cabin pressure closed loop control unit 1 through a conductor 14A. The fresh air treatment unit 8 is connected functionally and e.g. electrically with the air conditioning closed loop control unit 2 through a conductor 14B. The heat exchanger 4 is functionally and e.g. electrically connected with the cabin zone closed loop control unit 3 through a conductor 14C. Each of the conductors 14A, 14B, and 14C include sensor conductors and control conductors. The respective sensors S are part of the valve 11, the treatment unit 8 and the heat exchanger 4. Thus, a mutual information exchange takes place between these units 1 and 11, 2 and 8, and 3 and 4. The closed loop control units 1, 2, and 3 are interconnected by further conductors 14D and 14E for an information and control exchange.

One input of the cabin zone closed loop control unit 3 is functionally connected by a sensor conductor 14F to the sensor S at 16 in the air duct 13C between the air mixer 9 and the space 10. The sensor S at 16 is positioned upstream of the junction where the trim air duct enters into the air duct 13C so that information sensed at 16 can be used to control the trim air valve 12. A further input of the cabin zone closed loop control unit 3 is operatively connected by a sensor conductor 14G to a sensor S in the space 10 to be air-conditioned, whereby the respective sensors S at 16 and in space 10 supply information to the cabin zone closed loop control unit 3 in a one-way fashion. A sensor conductor 14H connects a sensor S in the air mixer 9 to yet another input of the unit 3.

An output of the cabin zone closed loop control unit 3 is connected with the trim air control valve 12 through a control conductor 14I. Another output of the cabin zone closed loop control unit 3 is connected through a control conductor 14J to the air blower 6, whereby the units 12 and 6 receive at their respective control inputs control signals from the cabin zone closed loop control unit 3 in a one-way fashion. The heat exchanger 4 through its conductors 14C delivers sensor information to unit 3 and receives control signals from unit 3. Separate conductors 14C are preferably provided for the just mentioned purpose.

As shown in FIG. 1, and mentioned above the present air circulation system for an aircraft comprises two series connections through which respective air flows take place. The first flow series connection includes a portion with the components 9 and 10 that is connected in parallel to the second series connection of components 7, 6, 5, 4. The bypass air duct 12A is connected in parallel to the series connection of the units 11, 8, and 9. The bypass air flow volume control valve 12 is positioned in the bypass air duct 12A. The valve 12 feeds fresh air into the air duct 13C near the sensor S at 16 but downstream thereof and functions as a trim air valve for supplying trim air into the air duct 13C between the unit 9 and space 10.

Figure 2:
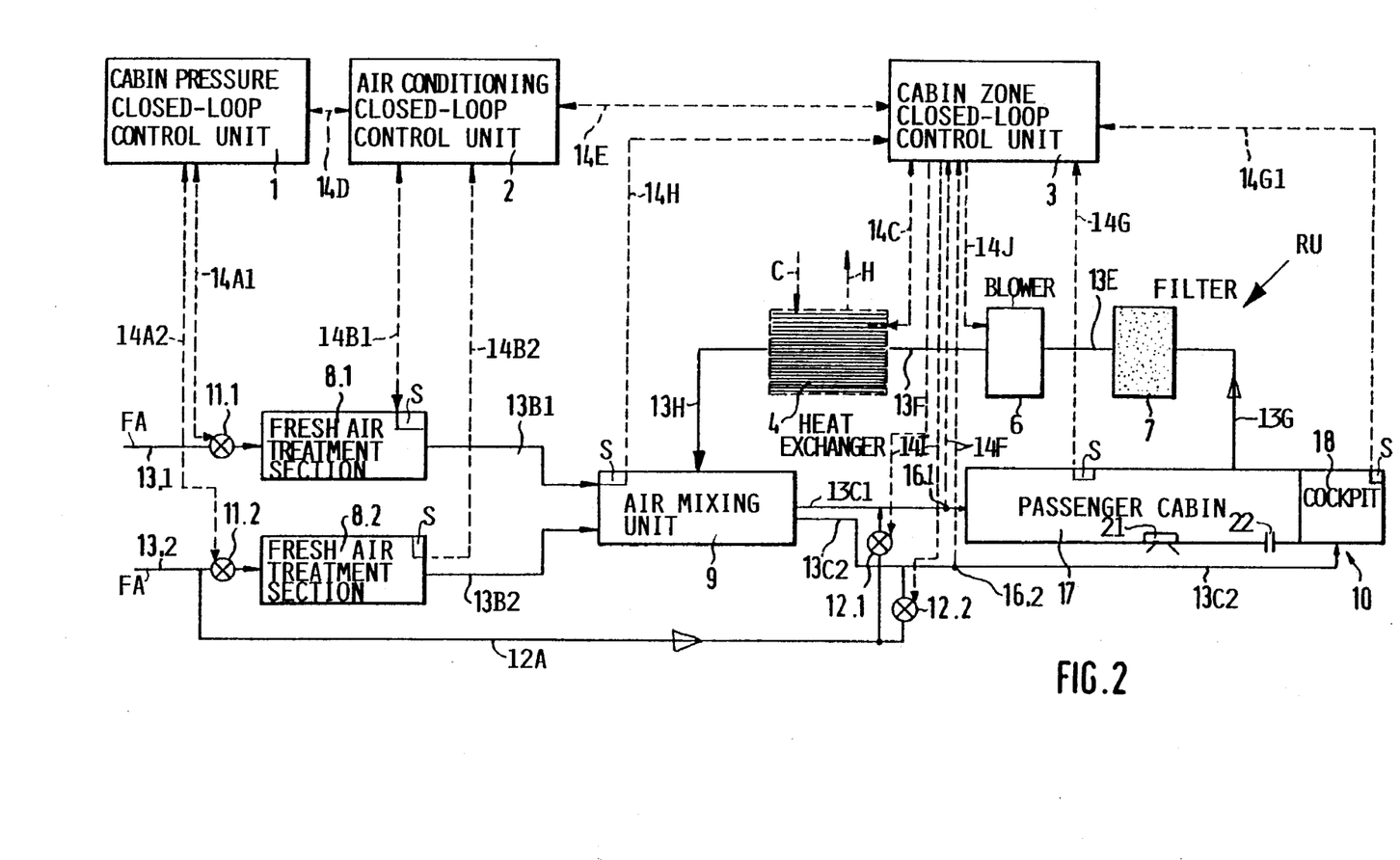
FIG. 2 is a block diagram similar to that of FIG. 1, however illustrating a system according to the invention without a $CO_2$ adsorber and with two parallel fresh air intake sections.

The air-conditioned space 10 contains the passenger cabin 17 or a plurality of sections of the passenger cabin 17 and the cockpit 18 as shown in FIG. 2. The space 10 has leakage devices 22 and an air outlet valve 21. The leakage devices 22 remove a small portion of the used air out of the aircraft body. Similarly, the valve 21 removes used air when the valve 21 is opened. According to the invention a substantial volume portion of the used air, for example 85% thereof, is flowing through the air duct 13G to a recycling unit RU formed as the second series connection comprising the filter 7 for removing particles and/or odor components as well as disease carriers, e.g. viruses, germs, bacteria and other contaminations from the recycled air volume portion sucked out of the space 10 by the blower 6 arranged downstream of the filter 7 as viewed in the air flow direction. The blower 6 is followed by the carbon dioxide adsorption unit 5 in FIG. 1. This unit 5 is omitted in the second embodiment shown in FIG. 2. The heat exchanger 4 follows the unit 5 or the blower 6. An air duct 13H returns the recycled air to the air mixer 9 at 9C. The second series connection of the units 7, 6, 5 and 4 is connected in parallel to the series connection of the mixing unit 9 and the space 10, whereby the output of the space 10 is connected to the input of the filter and input 9C of the mixing unit 9 is connected to the output of the heat exchanger 4 to receive treated, recycling air.

Air passing through the recycling unit RU has been treated in the filter 7 for the removal of particles and/or disease carriers, preferably both. Further, the filter 7 removes odor components. The blower 6 circulates the filtered air into the carbon dioxide adsorption unit 5 where excess carbon dioxide proportions are removed, for example, by a so-called "Fest-Amin-Filter". Preferably, the filter in the unit 5 is regenerated with heat from the recirculation air retrieved at the output H of the heat exchanger 4. Any excess heat is discharged outside the aircraft. The treated air then passes through the heat exchanger 4 where it is cooled by air taken from outside the aircraft, to a comfortable temperature level.

The just described treatment sequence yields a high air quality of the air being returned to the air mixer unit 9. This air quality is sufficient to avoid any danger to the passengers and crew in the space 10. The air exiting at 9B from the air mixer 9 has a desirable comfort temperature. However, the bypass or trim line 12A provides a further possibility of adjusting the temperature of the mixed air in the duct 13C that reaches the space 10 by an addition of so-called trim air, the volume of which is controlled by the trim air valve 12. The control signal for operating the trim valve 12 is supplied by the unit 3 through the control conductor 14I in response to information from the sensor S at 16.

Referring further to FIG. 1, the control for maintaining the cabin pressure will now be described. The pressure control closed loop unit 1 is connected to the volume control valve 11 by the control and sensor conductor 14A that provides a two-way information transfer between the control unit 1 and the valve 11. Further information regarding the cabin pressure may be provided through conductors 14D, 14E from the unit 3 that functions as a central processing unit.

Similarly, the air conditioning closed loop control unit 2 is connected with the air treatment unit 8 by a two-way sensor and control conductor 14B. Additional control information is provided through 14D and 14E from unit 3.

Sensor conductor 14H provides information from the air mixer 9 to the cabin zone closed loop control unit 3. Sensor conductor 14G provides sensor information from the air-conditioned space 10 to the control unit 3. Sensor conductor 14F provides sensor information from the sensor S at 16 in the air duct 13C between the mixing unit 9 and the space 10 to the control unit 3. Sensed information is also provided from the heat exchanger 4 through the two-way conductor 14C to the unit 3. The unit 3 controls the valve 12 through a control conductor 14I. A control conductor 14J connecting the unit 3 with the blower 6 provides control signals to the blower 6. The described conductors are preferably electrical signal conductors. However, for certain purposes pneumatic control conductors may also be used where suitable, for example for simply operating a switch. Optical conductors are also suitable. The conductor 14E interconnecting units 2 and 3 and the conductor 14D are preferably databus conductors.

The pressure control unit 1, the air conditioning control unit 2, and the cabin zone control unit 3 interact in their control and monitoring functions. The conductors 14A, 14B, and 14C function as transmitters for sensed information and as transmitters for control signals to the valve 11 to the air treatment unit 8 and to the heat exchanger 4. Each of these conductors will thus have at least two wires or two optical fibers. One-way sensed information is supplied from the respective sensors S through the conductors 14F, 14G and 14H to the control unit 3. Control signals are supplied through the control conductors 14I and 14J. Information sensed by sensors S in the space 10 is supplied to the control 3 through the conductor 14G. Based on such information, the control unit 3 generates control signals for operating the valve 12 through the conductor 14I and the blower 6 through the conductor 14J. Thus, depending on the sensor signals received in the control units 1, 2 and 3, these units will control the operation of the entire system as described above. The arrow heads in all Figures indicate the air flow direction in the full line air ducts and the information exchange direction in the dashed line connections.

FIG. 2 shows a modification in the embodiment of FIG. 1 by omitting the $CO_2$ adsorption unit 5. Additionally, FIG. 2 features two parallel connected fresh air treatment sections 8.1 and 8.2 and shows the system in operation during cruising flight. However, the system of FIG. 2 may easily use a $CO_2$ adsorption unit if desired. As shown, the recycling unit RU includes in the second series connection the filter 7, the blower or fan 6 and the heat exchanger 4 as in FIG. 1. However, if a $CO_2$ adsorption unit should be used in FIG. 2 its filter would again preferably be a so-called "Fest-Amin-Filter" which is capable to retain carbon dioxide components. Such a filter may be regenerated by using waste heat from the recirculated air provided by the heat exchanger 4 at its output H.

In accordance with the use of two fresh air treatment sections 8.1 and 8.2 referred to as so-called air treatment or air conditioning packs 8.1, 8.2 the volume air flow control valve 11 has been replaced by two respective volume control flow valves 11.1 and 11.2 connected to the fresh air intakes FA through air ducts 13.1 and 13.2 and to the inputs of the packs 8.1 and 8.2, respectively. Further, two trim air valves 12.1 and 12.2 are connected to the trim flow conductor 12A. The trim valve 12.1 is connected to the duct 13C1 leading from the air mixing unit 9 to the passenger cabin 17. The valve 12.2 is connected to the duct 13C2 leading from the air mixer 9 directly to the cockpit 18. The outputs of both packs 8.1 and 8.2 are connected through respective air ducts 13B1 and 13B2 to the air mixer 9, which is connected with one of its two separate outputs to the passenger cabin 17 and with the other to the cockpit 18. The air provided by the mixing unit 9 comprises a relatively small volume fresh air component from the packs 8.1 and 8.2 and a large volume recirculated air component provided by the output of the heat exchanger 4. The air mixer 9 mixes both air components just as in FIG. 1. By separately supplying air-conditioned air to the passenger cabin 17 and to the cockpit 18, it is possible to separately control the air flow to both sections 17 and 18 of the space 10 and to allocate relatively more fresh air to a space such as the cockpit that is substantially smaller than the passenger cabin space.

Rather than feeding the treated fresh air from two packs 8.1 and 8.2 into the air mixer 9, it is possible to let the fresh air from one of these packs 8.1 or 8.2 bypass the air mixer 9 so that, for example, the cockpit 18 receives its fresh air supply entirely independently of the recirculating unit RU. In the just mentioned modification the pack 8.2 could be connected through an air duct directly connected to the cockpit 18, preferably with a separate trim air supply 12.2 as shown. In any of these embodiments, the trim air is taken or tapped as fresh air upstream of the respective air treatment unit 8 or section 8.1, 8.2, preferably upstream of the valves 11, 11.1; 11.2. Further, in all instances trim air may be used for modifying the air that is supplied to the cabin 17 or cockpit 18.

In FIG. 2 the interconnection of the just described units is the same through the respective air ducts as in FIG. 1, except that in FIG. 2 the filter 7, blower 6, and heat exchanger 4 are connected in series with each other without the $CO_2$ adsorption unit. Further, the connection of the control units 1, 2 and 3 is the same as in FIG. 1, except that the packs 8.1 and 8.2 have separate sensor and control conductors 14B1 and 14B2. Each trim valve 12.1 and 12.2 has its own, separate control conductor 14I. Thus, the closed loop control of the air flow volumes and the control of the recycling is virtually the same as in FIG. 1 in response to the electrical adjustment and control values. However, in FIG. 2 the valves 11.1, 11.2, the fresh air treatment sections or packs 8.1 and 8.2 and the trim valves 12.1 and 12.2 are individually controlled. Thus, it is for example possible to completely separately control the fresh air supply to the cockpit 18 independently of any control of the air supply to the passenger cabin 17 thereby using no recirculated air for the cockpit 18.

Referring further to FIG. 2, separate sensors 16.1 and 16.2 are provided in the air ducts 13C1 and 13C2 between the air mixing unit 9 on the one hand and the passenger cabin 17 or cockpit 18 on the other hand so that respective electrical or optical signals on sensor conductors 14F are provided separately to the cabin zone closed loop control unit 3. These signals are evaluated in the unit 3 for the control of the valves 12.1 and 12.2. These sensors may sense the temperature and/or relative humidity and/or volume of the air supplied into the passenger cabin 17 and into the cockpit 18. Incidentally, this mentioned evaluation holds true for the sensor 16 in FIG. 1. Similarly, sensors S in the air mixer 9, in the passenger cabin 17 and in the cockpit 18 provide information through sensor conductors 14H, 14G, 14G1 to the cabin zone closed loop control unit 3. Based on such information the unit 3 generates the required control signals, whereby the status of the system is constantly monitored and correspondingly controlled when the system is in operation.

FIG. 3 shows schematically the arrangement of the various spaces within an aircraft body and the supply of air into these spaces, especially into the passenger cabin 17 and into the cockpit 18. In this embodiment the cockpit 18 is supplied directly from the fresh air treatment unit 8 through air duct 18A with air-conditioned air that does not include any recycled air. The space 19 that holds electronic and other electrical equipment receives air from the cockpit through a leakage device 22. The freight space 20 similarly receives fresh air through a leakage device 22. The freight space 20 is connected through leakage devices 22 to the outside air. The freight space may also be equipped with valves 21 for the release of air out of the freight space 20. As in FIG. 1, the filter 7, the blower 6, the $CO_2$ adsorption unit 5 and the heat exchanger 4 are connected in series with each other and the outlet of the heat exchanger 4 is connected to the inlet 9C of the mixer 9 which receives treated fresh air at its inlet 9A from the air conditioning or air treatment unit 8. The conditioned fresh air flows through the air duct 13C into the passenger cabin 17 where the treated air is distributed through conventional air distribution ducts AD. A used air return duct RD feeds used air from the cabin 17 to the inlet of the filter 7. As mentioned, the filter 7 is preferably a mechanical particle filter, an odor filter and a filter that eliminates disease carriers. However, depending on the size of the aircraft, a mechanical filter or an odor filter may be used.

The number of filters 7, blowers 6, $CO_2$ adsorbers 5, and heat exchangers 4 will also depend on the size of the aircraft, more specifically the number of passengers carried. As shown in FIG. 3 the second series connection comprises three filters 7, three blowers 6, three $CO_2$ adsorbers 5, and three heat exchangers 4. These components of each type are connected in parallel with each other to form a unit and the units are connected in series as described. The heat exchanger 4 receives outside cold air at C and discharges heat at H to the outside. Some of the discharge heat at 4B may be used for regenerating the filter in the $CO_2$ adsorber 5.

The addition of fresh air that has been preferably heated by the engines is no longer a necessity for maintaining the air quality in the aircraft cabin. The addition of fresh air, however, serves for replacing air that has leaked out of the pressurized aircraft body. The mere leakage compensation has been found, surprisingly, to be sufficient for maintaining a comfortable oxygen level. Thus, the air quality is primarily maintained by the filter 7 and by the $CO_2$ adsorber 5, except in those instances where the cockpit 18 is supplied exclusively with treated fresh air as shown in FIG. 3.

The control of the system is such that the air volume passing through the control valve 11 or the control valves 11.1 and/or 11.2 assures the following performance:

(a) leakage air is constantly replenished in the pressurized aircraft body;

(b) the pressurization is maintained, particularly the repressurization during descending flight, (c) the removal of waste heat or at least a substantial proportion thereof is assured in the air and on the ground, and (d) the supply of fresh air is minimized so as to keep the dimensions of the filter 7 relatively small and the efficiency of the filter 7 large.

The closed loop control through the units 1, 2, 3 of the climate or air conditioning packs 8, 8.1, and 8.2 and of the cabin pressurization maintenance system (CPCS) 11, 11.1, 11.2 is performed with a view to maintaining the above performance. The control of the pressurization is assured by the flow control valves (FCV) 11, 11.1, 11.2. Thus, the pressure in the aircraft body is no longer maintained exclusively with reference to the air volume that leaves the aircraft body, but rather by the volume of fresh air introduced into the body B. This fresh air volume is now substantially smaller than in conventional systems due to the large recirculation volume according to the invention.

The temperature control is assured by the separate heat exchanger 4 in the path of the recirculation air through the second series connection. The cooling medium is outside air similar to the air supplied to the climate or air conditioning packs 8.1 and 8.2. The regeneration of the carbon dioxide filters such as a "Fest-Amin-Filter" is accomplished with the aid of the waste heat H from the recirculation air. These features all contribute to reducing the total fuel consumption of the entire system, whereby the closed loop controls 1, 2 and 3 which are coordinated to each other, assure the proper control of the entire air conditioning system.

It should be mentioned here that the present cabin air recycling system is used in an especially efficient manner during cruising flight at high altitudes where use of the cold outside air in the heat exchanger contributes to the efficiency. However, when the aircraft is on the ground the present system works as well provided the heat exchanger 4 has a sufficient capacity.

The filter or filters system 7 are compatible in its operation with conventional air conditioning closed loop controls.

For larger aircraft it is preferable to separately air-condition the passenger cabin 17 and the cockpit 18 for an independent control of each of these spaces as described above with reference to FIGS. 2 and 3. For this purpose the passenger cabin 17 and the cockpit 118 are separately connected to the air mixer 9 as shown in FIG. 2, whereby the separate air flow ducts 13C1 and 13C2 each have a sensor 16.1, 16.2 operatively connected with the respective input of the cabin zone closed loop control unit 3 for generating control signals based on information provided by the sensors 16.1, 16.2. In the alternative, the cockpit 18 may have a completely separate fresh air supply as shown in FIG. 3.

FIG. 2 also shows that the fresh air treatment unit 8 is divided into at least two fresh air treatment sections referred to above as packs 8.1 and 8.2 which are conductively, electrically or optically connected with the air conditioning closed loop control unit 2 for a mutual information exchange between these components. In such an embodiment at least two air flow control valves (FCV) 11.1 and 11.2 forming part of an air volume control circuit are preferred for an individual flow control. These flow control valves are connected into the air ducts upstream of the fresh air treatment packs 8.1 and 8.2. These valves receive fresh air at their separate inlets, one of which may provide hot air from the engine and the other may provide cold air from outside the aircraft. Further, these valves 11.1 and 11.2 are conductively, preferably electrically or optically, connected with the cabin pressure closed loop control unit 1 for a mutual information exchange between these components.

A more individual control of the air in the passenger cabin 17 and in the cockpit 18 is achieved by replacing one trim air control valve 12 shown in FIG. 1 by at least two trim air control valves 12.1 and 12.2 which branch off from a common trim air duct 12A and feed trim air into separate air conduits 13C1 and 13C2 between the air mixer 9 and the passenger cabin 17 and between the air mixer 9 and the cockpit 18. However, the single duct could be replaced by separate trim air ducts one for each valve 12.1, 12.2. Further, the trim air control valves 12.1 and 12.2 are connected to a respective output of the cabin zone closed loop control unit 3 by individual, separate control conductors 14I which transmit a control signal from the control unit 3 for opening or closing the respective trim valve 12.1, 12.2 in response to information sensed by sensors 16.1 or 16.2 and transmitted to unit 3 on separate conductors 14F. This information will normally be a temperature value of the air coming out of the air mixer 9. Hence, the sensors 16, 16.1, 16.2 will be positioned for measuring the temperature before trim air is added. In other words, these sensors will be positioned upstream of the junction where trim air is added to the air in the air duct leading from the mixer output to the space 10 as shown in FIG. 1 for sensor 16. The same applies to FIG. 2 even through the sensors 16.1 and 16.2 are shown, for mere drawing convenience, downstream of the junctions where trim air enters into the air ducts 13C1 and 13C2. In fact these sensors 16.1 and 16.2 will be positioned to measure the air temperature preferably directly at the respective outputs of the air mixer 9. Instead of or in addition to measuring the temperature at the output of the air mixer 9, the relative humidity and/or the air volume may be measured at 16, 16.1, 16.2. An electrical, optical, or pneumatic control signal will be provided by the closed loop control unit 3 for operating the trim valves.

The control conducting connections provide a closed loop control and these loops form a network within the recycling air system.

This network makes possible an information exchange between the control unit on the ground and during cruising flight for performing the required control functions.

In practice the particle and/or odor filter 7, the blower 6, the carbon dioxide adsorbing unit 5, and the heat exchanger 4 are assembled of a plurality of functionally equivalent devices which are integrated into the respective unit as shown in FIG. 3.

The particle filter unit 7 and/or the odor filter unit 7 is constructed to retain components out of the recirculation air. Such components to be removed are particles, disease carriers, and odor causing or odor carrying elements, and other contaminations.

The carbon dioxide adsorbing unit 5 is constructed of filter materials capable of adsorbing $CO^2$. Such filters as such are conventional. So called "Fest-Amin" filters have been found to be useful. These filters can be regenerated, whereby preferably waste heat from the recirculation air provided in the heat exchanger 4 is used for the regeneration.

The advantages achieved by the invention are substantially seen in that the present recirculation system permits treatment of a high proportion up to about 85% by volume of the used air particularly during cruising flight since cooling in the heat exchanger 4 is facilitated by using the cold external air at high altitudes for the cooling. However, the present system can be used on the ground as well, provided the heat exchanger 4 has the required capacity. The invention simultaneously reduces the addition of external fresh air into the pressurized space inside an aircraft body to about 15 vol. % which has been found to be sufficient. The fresh air supply takes place in such a way that the pressure control inside the pressurized aircraft body and the maintaining of the pressurization and compensating for leakage and maintaining the required oxygen content is assured, while removing a substantial proportion of the heat load from the pressurized space inside the aircraft body.

The present recycling of the cabin air assures the maintenance of an optimal air quality. This is so because the present system eliminates the spreading of disease carriers, odor causing substances, and other contaminations in the recirculated air. The system further assures the proper temperature of the recycled air as well as the adsorption of any excess carbon dioxide proportions in the cabin air. The recirculation air treated as disclosed herein and added to the minimal fresh air volume flow contributes to the increase of the relative humidity of the cabin air which conventionally is undesirably low. The increase of the relative humidity makes the air more comfortable to passengers and crew. The present recycling system substantially reduces the fuel consumption compared to the total fuel consumption especially during cruising flight. The system realizes the required air quality and health conditions the air must meet in a passenger aircraft, whereby the high degree of cleanness of the conditioned air is very advantageous to passengers and crew.

Although the invention has been described with reference to specific example embodiments, it will be appreciated that it is intended to cover all modifications and equivalents within the scope of the appended claims.

What is claimed is:

1. An air conditioning system for an aircraft comprising an aircraft body including a space to be air-conditioned, a plurality of fresh air handling first components (11, 8, 9, 10) including said space (10), first air ducts interconnecting said first components to form a first series connection for feeding fresh air, a plurality of used air recycling second components (4, 6, 7), second air ducts interconnecting said second components to form a second series connection, third air ducts (13G, 13H) connecting said second series connection in parallel to a portion of said first series connection so that recycled air is mixed with fresh air for introducing mixed air into said space, and closed loop control means connected to any one of said first and second components for controlling an air flow through said first and second series connections, said system further comprising at least one trim air duct (12A) and at least one trim air valve (12) connected to bypass a portion of said first series connection and connected to a junction upstream of said space (10) for feeding trim air into said mixed air, and wherein said trim air valve (12) operatively connected to said closed loop control means for controlling the volume of trim air added to said mixed air.

2. The air conditioning system of claim 1, wherein said first components comprise a fresh air inlet (FA), a fresh air flow control valve (11), a fresh air treatment unit (8), an air mixer (9), and said space (10) connected in series by said first air ducts, wherein said second components comprise a filter (7), a blower (6), a $CO_2$ adsorber (5), and a heat exchanger (4) connected in series by said second air ducts, said portion of said first series connection comprising said air mixer (9) and said space (10), said third air ducts connecting said second series connection in parallel to said air mixer (9) and said space (10).

3. The air conditioning system of claim 1, wherein said closed loop control means comprise controllers (1, 2, 3) and sensors selected from the group of pressure sensors, temperature sensors, and relative humidity sensors positioned for sensing respective actual values and connected to a respective controller of said controllers for providing control information to said respective controller to produce control signals for a closed loop control of said system.

4. The air conditioning system of claim 1, wherein fresh air fed into said first series connection amounts to about 15 vol. % of the total air volume circulating in said system, and wherein said recycled air passing through said second series connection amounts to about 85 vol. % of said total air volume, whereby the fuel consumption of said aircraft is reduced compared to aircraft of the same size equipped with a conventional air conditioning system.

5. The air conditioning system of claim 1, further comprising a carbon dioxide adsorber (5) in said second series connection.

6. The air conditioning system of claim 1, wherein said fresh air handling first components include an air mixer (9), said air conditioning system further comprising a sensor (S, 16) in an air duct section (13C, 13C1, 13C2) between said air mixer (9) and said space (10), and a sensor conductor (14F) connecting said sensor (S) to said closed loop control means (3).

7. The air conditioning system of claim 1, wherein said space (10) is divided into at least one passenger cabin (17) and a cockpit (18) forming separate areas to be separately air conditioned.

8. The air conditioning system of claim 1, wherein said second series connection comprises a filter (7) constructed to remove from recirculating air any one of particles, disease carriers, odor carriers, and any other contaminations.

9. The air conditioning system of claim 5, wherein said carbon dioxide filter is a solid material filter comprising solid materials that are capable of regeneration by the application of heat, especially waste heat from the recirculation air.

10. The air conditioning system of claim 2, wherein said carbon dioxide adsorber (5) is connected between said blower (6) and said heat exchanger (4) in said second series connection.

11. The air conditioning system of claim 1, wherein said first series connection comprises a fresh air intake (FA), a fresh air volume control (11; 11.1, 11.2), a fresh air treatment unit (8; 8.1, 8.2), an air mixer (9), said space (10) and first air ducts forming said first series connection, and wherein said at least one trim-air duct (12A) is connected in parallel to said fresh air volume control (11), to said fresh air treatment unit (8), and to said air mixer (9).

12. The air conditioning system of claim 1, wherein said second components further comprise in said second series connection a blower (6), a filter (7) and a heat exchanger (4), and wherein said blower (6) is directly connected with its suction inlet to said filter (7) and with its pressure outlet to said heat exchanger (4).

13. The air conditioning system of claim 1, wherein said fresh air handling first components comprise a fresh air mixer (9) having two separate outputs, wherein said space (10) comprises a passenger cabin (17) and a cockpit (18), and wherein a section (13C1) of said first air ducts connects one of said two separate outputs to said passenger cabin (17), said system further comprising a bypass air duct (13C2) directly connecting the other of said two separate outputs to said cockpit (18), said closed loop control means comprising two separate sensors (16.1, 16.2) one of which is arranged in said first air duct section (13C1) while the other is arranged in said bypass air duct (13C2) leading to said cockpit (18), said at least one trim air duct (12A) comprising two branch trim air ducts each comprising its own trim air valve (12.1, 12.2), and electrical conductors (14F) connecting said two separate sensors (16.1, 16.2) separately to a respective closed loop control unit (3) of said closed loop control means for a closed loop control of said two separate trim air valves (12.1, 12.2) connected between said air duct sections (13C1, 13C2) and said fresh air intake (FA) by said trim air duct (12A), and control conductors (14I) connecting said separate trim air valves (12.1, 12.2) to said respective control unit (3) for said closed loop control of said trim air valves (12.1, 12.2).

14. The air conditioning system of claim 2, wherein said fresh air treatment unit (8) comprises at least two fresh air treatment sections (8.1, 8.2) individually controlled in closed loop fashion by a respective closed loop control unit (2) of said closed loop control means, and a fresh air flow control comprising two flow volume control valves (11.1, 11.2) each connected in a fresh air inlet duct (13.1, 13.2) for feeding fresh air individually to said two fresh air treatment sections (8.1, 8.2), and wherein said two flow volume control valves (11.1, 11.2) are individually controlled in closed loop fashion by a respective closed loop control unit (1) of said closed loop control means.

15. The air conditioning system of claim 2, comprising first and second trim air valves (12.1, 12.2), said first trim air valve (12.1) being connected to an air duct (13C1) connecting said air mixer (9) to a passenger cabin in said space (10), said second trim air valve (12.2) being connected to an air duct (13C2) connecting said air mixer (9) to a cockpit (18) in said space (10), and wherein said first and second trim air valves (12.1, 12.2) are connected to receive control signals from a respective closed loop control unit (3) for opening and closing said trim air valves (12.1, 12.2) in a closed loop control.

16. The air conditioning system of claim 15, further comprising sensors (S) positioned for sensing closed loop control information regarding temperature, relative humidity, and air flow volume in said system, and sensor conductors (14B1, 14B2) connecting said sensors (S) to said closed loop control units for providing closed loop control information.

17. The air conditioning system of claim 1, wherein said second components comprise a filter, a blower and a heat exchanger connected in series with each other in said second series connection, and wherein each of said filter (7), said blower (6), and said heat exchanger (4) comprises a plurality of respective sections, whereby sections of the same type are connected in parallel to each other to form respective units that are connected to form said second series connection.

18. The air conditioning system of claim 17, further comprising a carbon dioxide adsorber (5) in said second series connection, said carbon dioxide adsorber (5) comprising a plurality of $CO_2$ adsorber sections connected in parallel to each other.

* * * * *